US009167378B2

(12) United States Patent
Romano

(10) Patent No.: US 9,167,378 B2
(45) Date of Patent: Oct. 20, 2015

(54) METHOD TO ACCESS MULTIMEDIA CONTENTS ASSOCIATED TO A GEOGRAPHICAL AREA

(75) Inventor: Fabio Romano, Napoli (IT)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 907 days.

(21) Appl. No.: 12/183,861

(22) Filed: Jul. 31, 2008

(65) Prior Publication Data

US 2009/0036147 A1 Feb. 5, 2009

(30) Foreign Application Priority Data

Aug. 3, 2007 (IT) .................................. MI07A1607

(51) Int. Cl.
  H04W 24/00 (2009.01)
  H04W 4/02 (2009.01)
  G06F 17/30 (2006.01)
  H04L 29/06 (2006.01)
  H04W 64/00 (2009.01)
  H04W 76/02 (2009.01)
  H04L 29/08 (2006.01)

(52) U.S. Cl.
  CPC .............. *H04W 4/02* (2013.01); *G06F 17/3087* (2013.01); *H04L 65/4084* (2013.01); *H04L 67/18* (2013.01); *H04W 64/00* (2013.01); *H04W 76/02* (2013.01)

(58) Field of Classification Search
  USPC ....................................................... 455/456.3
  See application file for complete search history.

(56) References Cited

U.S. PATENT DOCUMENTS

| 6,091,956 | A | 7/2000 | Hollenberg | 455/456 |
| 6,160,551 | A | 12/2000 | Naughton et al. | 345/339 |
| 6,202,023 | B1 | 3/2001 | Hancock et al. | 701/201 |
| 6,453,230 | B1 * | 9/2002 | Geurts | 701/117 |
| 2002/0021674 | A1 * | 2/2002 | Thorne et al. | 370/252 |
| 2006/0089160 | A1 | 4/2006 | Othmer | 455/457 |
| 2007/0219708 | A1 * | 9/2007 | Brasche et al. | 701/207 |

FOREIGN PATENT DOCUMENTS

WO 01/22633 A1 3/2001 ............... H04H 1/04

OTHER PUBLICATIONS

Pradhan et al. "Websigs: Hyperlinkiing Physical Locations to the Web" HTTP:/hotgates.stanford.EDU/eyes/websignes-IEEE.PDF: Aug. 2001; pp. 42-48.

* cited by examiner

Primary Examiner — Muthuswamy Manoharan
(74) Attorney, Agent, or Firm — Allen, Dyer, Doppelt, Milbrath & Gilchrist, P.A.

(57) ABSTRACT

A method is for accessing multimedia contents associated with a geographical area including a plurality of items, the multimedia content being stored on a multimedia content provider having information of one or more of the items. The method provides an IC Card application for enabling a mobile device to detect a geographical area of interest, connect to the multimedia content provider and select at least one multimedia content of the detected geographical area of interest, download the selected multimedia content into a memory of the IC Card, provide an identification code of an item located into the detected geographical area of interest, and access a portion of the multimedia content which stores information of the identified item.

21 Claims, 3 Drawing Sheets

METHOD TO ACCESS MULTIMEDIA CONTENTS ASSOCIATED TO A GEOGRAPHICAL AREA

FIELD OF THE INVENTION

The present invention relates to a method to access multimedia contents associated with a geographical area including a plurality of items, each multimedia content being stored in a multimedia content provider and storing information of one or more items.

More particularly, the present invention relates to a method of the type described above wherein the multimedia content is downloaded from the multimedia content provider into a mobile device that is used to reproduce it.

BACKGROUND OF THE INVENTION

As it is known, a method to access multimedia contents associated to a geographical area provides a device for storing the multimedia content and for reproducing or playing it for a user.

For example, in a geographical area like a museum, a device like an audio and/or video guide stores information associated to a plurality of items located there, i.e. artwork such as paintings, sculptures, etc.

Such devices include a mobile device rented to the user at the entrance of the museum so that the he may carry it during a tour in the museum, for listening and/or watching information associated to specific items.

Methods to access multimedia contents associated to a geographical area through a mobile phone are known. The methods include a user dialing a predetermined service number on the mobile phone, the mobile phone connecting to a multimedia content provider providing a list of multimedia contents. The user selects a multimedia content and receives it on the mobile phone for listening and/or watching.

Even if such methods are advantageous because they avoid a user renting the audio and/or video guide and carrying additional weight during the tour, they suffer from limitations. For example, the multimedia content device may not be stored into the mobile device, so that it may not be reproduced or played more than one time, and may not be suspended during the tour or restarted from the description of a specific item.

Moreover, the method may not transmit the multimedia content to the mobile phone if a network coverage of a telecom operator is not available in the geographical area of interest. Furthermore, such method may not manage phone calls entering the mobile phone while the mobile phone is connected to the multimedia content provider.

Other methods use a mobile device, more particularly a mobile computer or a PDA, to download the multimedia content of the geographical area of interest into a memory portion so that the multimedia content may be reproduced or played more than one time, even if the network coverage is absent in the geographical area of interest.

In fact, the user may download the multimedia content before reaching the geographical area of interest, connecting the mobile device with a multimedia content provider available in a network, for example to the Internet, and storing such content inside a memory portion for a following use.

Even if such method allows reproduction or playing of the multimedia content and avoids keeping the mobile phone busy during the listening and/or watching of items, it is limited for the fact that the user carries the PDA or the mobile computer.

Such PDA's and mobile computers are generally provided with a great number of functions but they are much more expensive, not small sized and light weight, and not so easy to be used.

SUMMARY OF THE INVENTION

The aim of the present application is to provide a method to access a multimedia content associated to a geographical area, the method providing a small sized and light weight mobile device to access such content, more particularly a mobile phone able to reproduce or play multimedia content when the network coverage of the telecom operator is absent, at the same time avoiding a lock of reception capability of phone calls if such network coverage is present, and overcoming the limitation that currently affects the methods to access multimedia contents according to the prior art.

An aspect is directed to enabling a mobile phone to access the multimedia content stored on a multimedia content provider by downloading the multimedia content associated to a geographical area of interest into an IC Card of the mobile phone, so that the multimedia content may be reproduced or played, off-line if a network coverage is absent, or without blocking an incoming phone call during the reproduction or playing of the multimedia content, if such network coverage is available. The IC Card provides additional capability to access predetermined portions of the multimedia content, descriptive of specific items located in the geographical area of interest.

According to an aspect, a method is to access multimedia contents associated to a geographical area including a plurality of items, the multimedia content being stored in a multimedia content provider and storing information of one or more of the items. The method provides an IC Card application for enabling a mobile device to execute the following steps: detecting a geographical area of interest, connecting to the multimedia content provider and selecting at least one multimedia content related to the detected geographical area of interest, downloading the selected multimedia content into a memory of the IC Card, and providing an identification code of an item located into the detected geographical area of interest and accessing a portion of the multimedia content which stores information of the identified item.

Another aspect is directed to an IC Card for reading multimedia contents associated to a geographical area including a plurality of items, the multimedia content being of the type stored on a multimedia content provider and including information of one or more of the items. The IC Card includes an application comprising computer executable modules to detect a geographical area of interest, connect to the multimedia content provider and selecting at least one multimedia content of the detected geographical area of interest, download the selected multimedia content into a memory of the IC Card, and provide an identification code of an item located into the detected geographical area of interest and accessing a portion of the multimedia content which stores information of the identified item.

Advantageously, according to the methods herein, a mobile phone that is a light weight, small sized, and easy to use is provided to access multimedia information.

Advantageously, the method provides that the mobile phone downloads the multimedia content from a multimedia content provider, when a network coverage of a telecom operator is available. The downloaded multimedia content is stored so that it may be reproduced or played one or more times, stopped and re-executed, or started from a predetermined portion associated to a specific item when the network coverage is absent.

Advantageously, the method provides that the mobile phone may automatically detect the geographical area of interest or provide to the user a list of predetermined geographical area for which to download corresponding multimedia content.

Advantageously, the method provides that the mobile phone may access a specific portion of the multimedia content, associated to a specific item, by detecting the specific item.

Advantageously, such detection may be executed automatically, since the method provides the IC Card with detection means, circuitry or executable modules to identify codes associated to the items, or manually, since the method sends the identification code of an item via an input interface of the mobile phone.

Other features and advantages of the methods and devices described herein will be apparent from the following description of an embodiment thereof, given by way of non-limitative example with reference to the accompanying drawings.

DETAILED DESCRIPTION OF THE PREFERRED EMBODIMENTS

With reference to the annexed drawings, a method to access multimedia contents is schematically represented and globally indicated with numeral reference 10.

The multimedia contents MMC1, MMC2 are associated to a geographical area A including a plurality of items I1, I2, I3. The geographical area A is, for example, the area delimited by a building like a museum or a fair wherein a plurality of items are exposed, i.e. artworks like paintings, sculptures, or technological products, clothes, etc.

Figure 1:
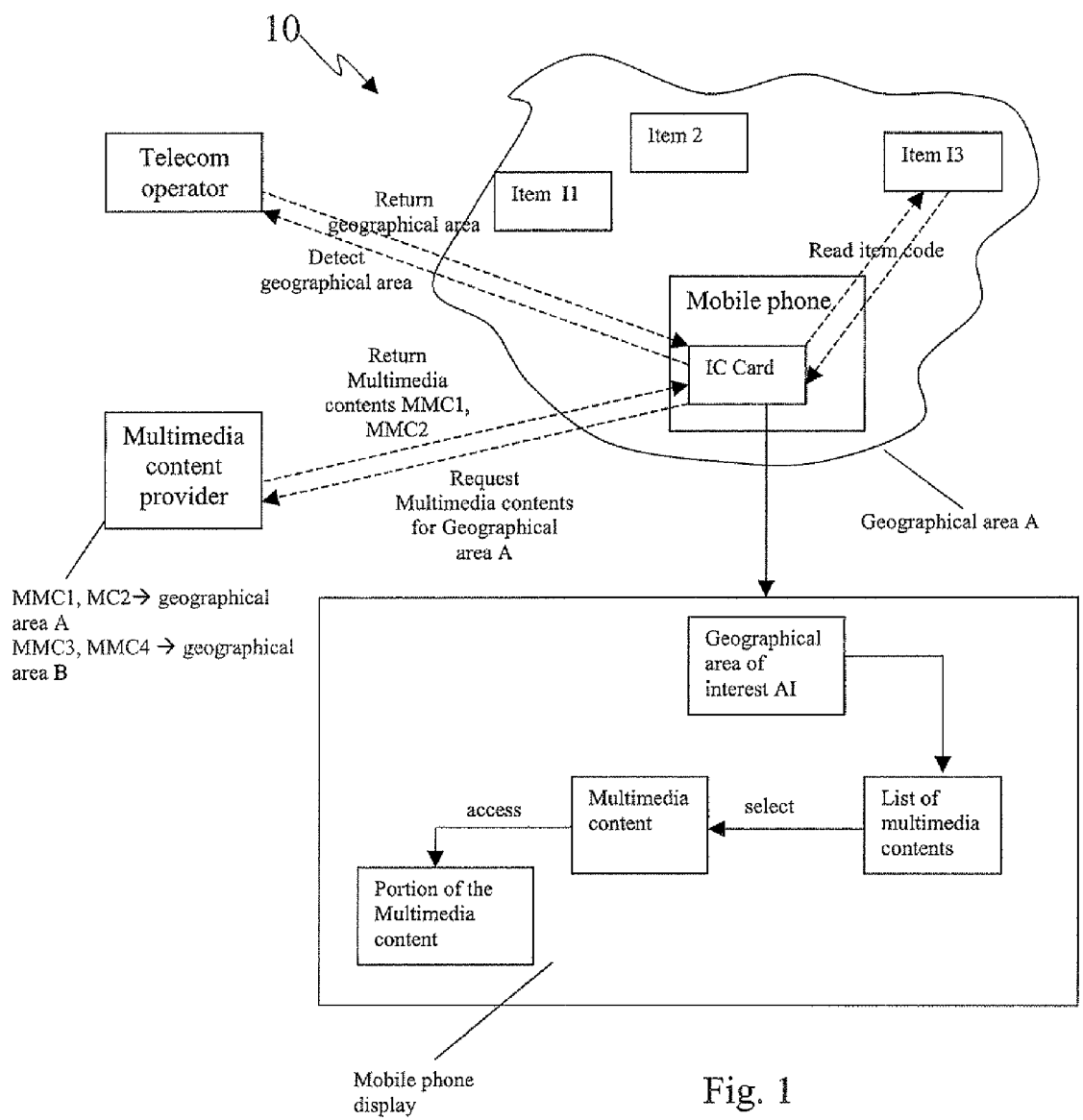
FIG. 1 schematically represents, in a block diagram, the steps of a method to access multimedia content associated with a geographical area, according to the present invention.

A multimedia content provider stores a plurality of multimedia contents MMC1, MMC2, MMC3, MMC4, including the multimedia contents MMC1, MMC2 associated to the geographical area A and multimedia contents MMC1, MMC2 associated to a geographical area B. As represented in FIG. 1, multimedia contents MMC1, MMC2 store information of one or more items I1, I2, I3 located in the geographical area A.

More particularly, one single multimedia content MMC1 may store information associated to one single item I1 or information associated to a plurality of items I1, I2; in the last case, the multimedia content MMC1 includes a plurality of portions associated to corresponding items I1, I2 that are located in the geographical area of the multimedia content MMC1 itself.

The portion of an item I1 is identified by a code IdI1 associated, for example attached, to the item I1.

A mobile phone receives the multimedia contents MMC1, MMC2 from the multimedia content provider, for reproducing or playing audio and/or video on a user demand.

According to the method, an IC Card application embodied in one or more computer executable modules is for enabling the mobile phone to execute an advantageous download and reproduction of the multimedia contents, as will be apparent from the following description.

More particularly, the method detects a geographical area of interest AI including items I1, I2, I3 about which the user wants to know information.

The step to detecting the geographical area of interest AI comprises different execution modes, substantially providing an automated detection executed by the IC Card or a manual detection including a contribution of the user.

The automated detection provides that the mobile phone is connected to a network, for example a network of a telecom operator, to detect the geographical location wherein the mobile phone is located. Such geographical location is obtained by detecting a cell of the telecommunication network whereto the mobile phone is connected.

In fact, the cell stores information associated to the physical location wherein the mobile phone is located.

According to the automated detection, the geographical area of interest AI is set to the physical location. Advantageously, a user may select the automated detection when he is interested to have information about item located where he is in a certain moment.

With reference to FIG. 1, an automated detection is schematically represented wherein the IC Card sends to the telecom operator, via the mobile phone, a request for detecting the geographical location wherein the mobile phone is located. The telecom operator returns to the IC Card the geographical location that is set to the geographical location of interest AI.

The mobile phone sends to the multimedia content provider the geographical location of interest AI, more particularly an identification number or code of the location. The multimedia content provider returns to the mobile phone a list or set of the multimedia content MMC1, MMC2 associated to the identification code of the geographical location of interest AI. The list of the multimedia content MMC1, MMC2 is stored in a memory of the mobile phone.

A step of selecting at least one specific multimedia content MMC1 in the list of multimedia contents MMC1, MMC2 is executed by the user. Even if in FIG. 1 the step of detecting is represented with reference to the automated detection mode, it is easy to understand that selection of the geographical area of interest AI may be executed in manual mode, for example selecting it in a set of predetermined geographical areas A1, A2, AI, stored in the memory portion of the IC Card. The mobile phone provides an input interface, allowing the user to browse a plurality of geographical areas displayed on a menu.

More particularly, the set of predetermined geographical areas A1, A2, AI may advantageously include a plurality of subset of geographical areas A2, AI, in order to facilitate the selection of the geographical area of interest AI.

Figure 5:
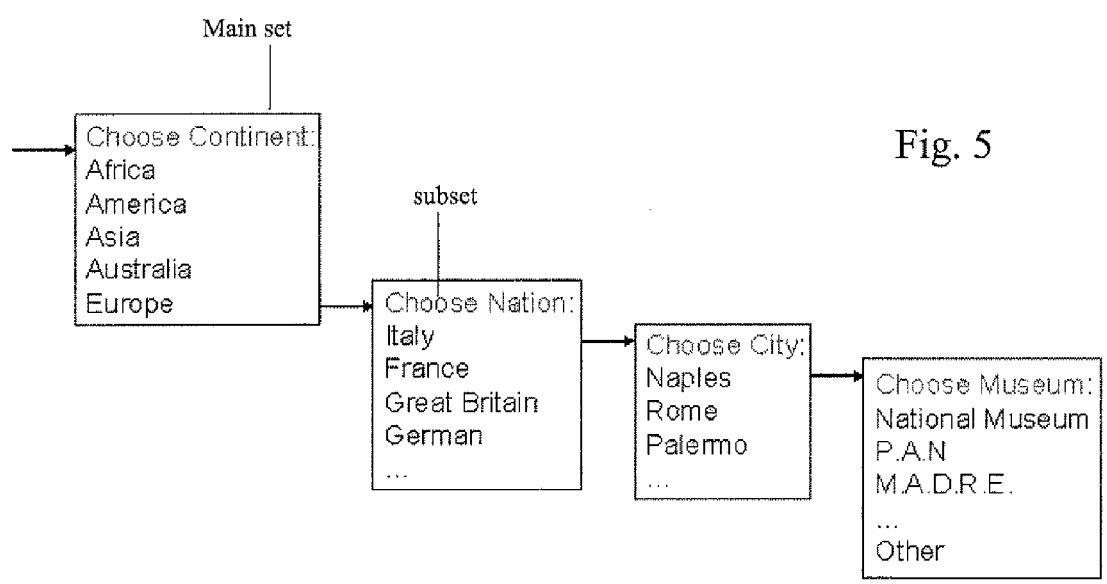
FIG. 5 schematically represents, in a block diagram, the steps of detecting the geographical area of interest, and selecting it in a subset of geographical areas included in a set of main geographical areas, according to the present invention.

With reference to FIG. 5, a graphical interface provided by the IC Card according to the method is schematically represented. The graphical interface include a main set comprising a list of continents, a first subset including a list of nations included in a selected continent. In a similar way, the method provides additional grouping level of areas. As it is apparent, the geographical area of interest may be sent in different way to the multimedia content provider, for example through an SMS including the path representing the selections among the set and subsets of geographical areas.

After a manual selection of a geographical area of interest AI, a set of multimedia contents MMC1, MMC2 associated to such geographical area of interest AI are identified so that the user may select at least one multimedia content MMC1 to be downloaded.

More particularly, the multimedia content MMC1 selected in automated or in manual mode is downloaded into the memory of the IC Card and is listened and/or watched.

According to the method, the IC Card not only allows the reproduction or playing of the multimedia content MMC1 one or more time but also to access to specific portions of such content in a manner that will be clear from the following description.

The items I1, I2, I3 located in the geographical area of interest AI are provided with a respective identification code IdI1, IdI2, IdI2, for example written on a label attached to the items.

The identification code idI1 of the item I1 is sent to the IC Card in order to access a portion P of the multimedia content MMC1 which stores information of the item I1 identified by its identification code IdI1.

More particularly, according to an embodiment, the step of providing the identification code idI1 is executed by receiving a wireless message from a device associated to the item I1.

For example, the device attached to the item I1 is a ZigBee device storing the identification code idI1. A ZigBee device is included in the IC Card so that the mobile phone may read from the device attached to the item I1 of the corresponding identification code.

According to another embodiment, the step of providing an identification code idI1 is executed by manually entering the identification code idI1 through an input interface of the mobile phone. Such identification code is read by the user from the label and sent to the IC Card via the input interface.

Figure 2:
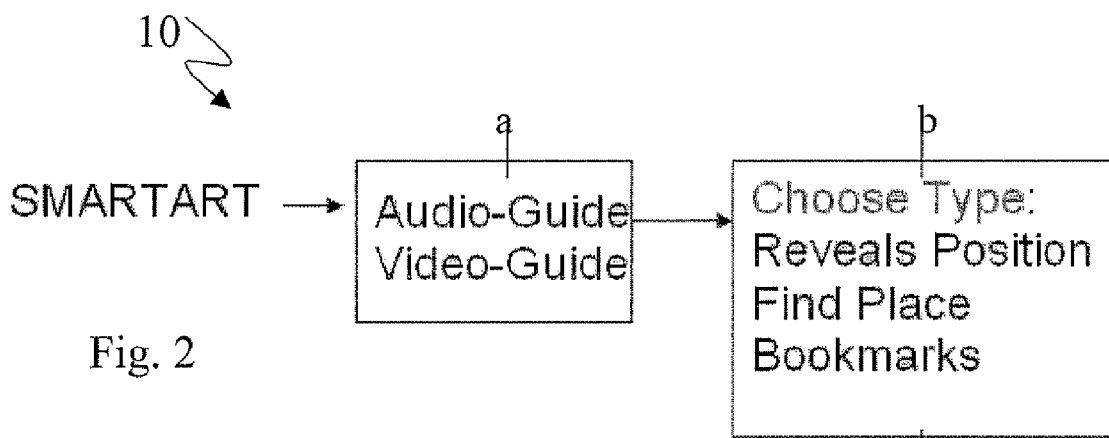
FIG. 2 schematically represents, in a block diagram, the step of detecting a geographical area of interest, according to the present invention.

Referring more to FIG. 2 a first block a) of a diagram schematically represents the step in which a user recalls an application stored inside an IC Card and selects a type of multimedia content he is going to reproduce or play and/or download on the mobile phone, more particularly audio and/or video multimedia content. More particularly, in FIG. 2 the SMARTART is a SetupMenu Item that, when selected, sends a Select Item proactive command including an Audio-Guide item and a Video-Guide item.

A second block b) represents the selection of the mode to detect the geographical position of interest resulting in the detection of a geographical area of interest, as per block c) of the diagram.

Figure 3:
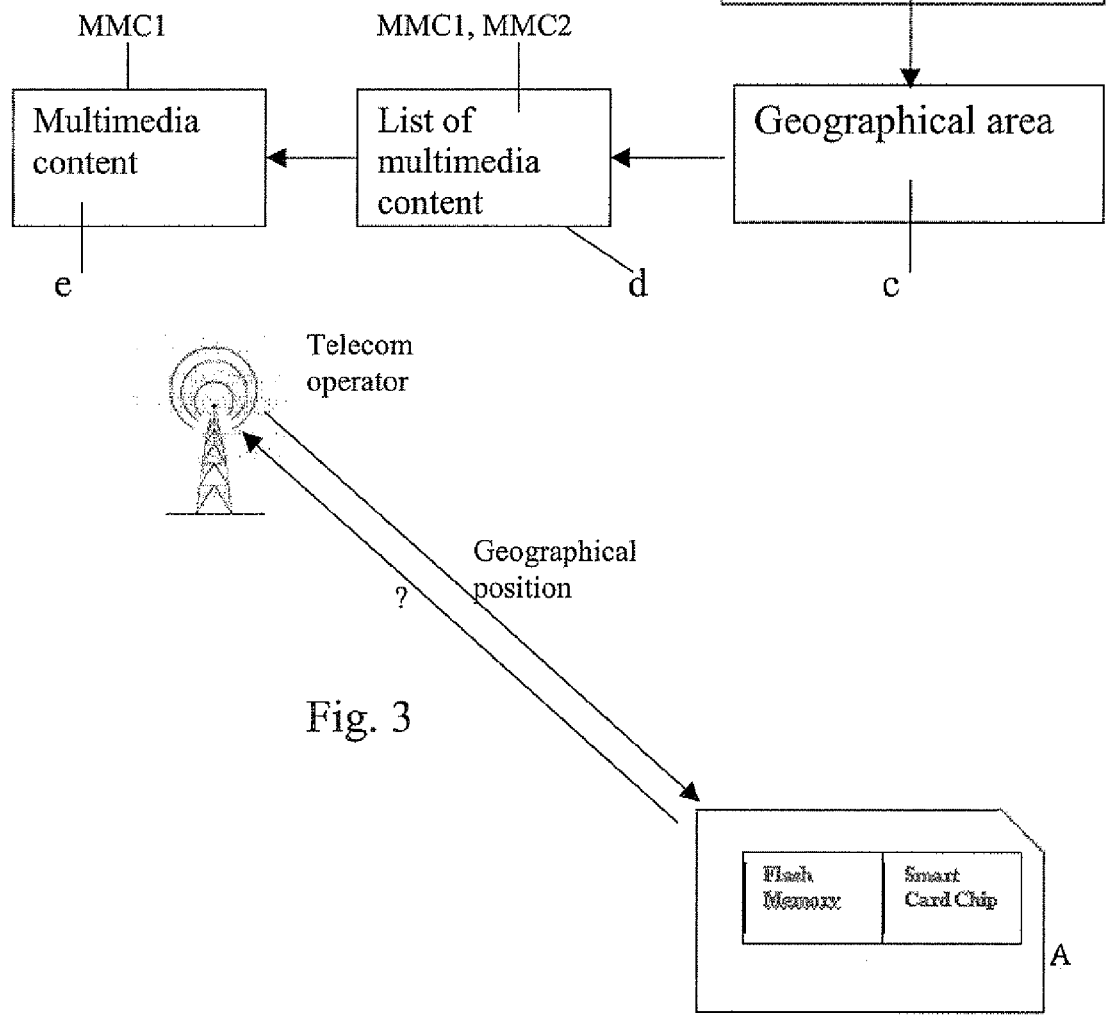
FIG. 3 schematically shows a connection between a telecom operator and an IC Card for executing the step of detecting the geographical area of interest of FIG. 2.

Selecting "reveal position," an automated detection is executed to determine the geographical area of interest as the physical location, in order to detect the information available for items located in the neighborhood. In FIG. 3 is schematically represented a connection between a telecom operator and the IC Card in order to detect the physical location. Selecting "find place," a manual selection is executed as described with reference to FIG. 5; the user specifies a geographical area of interest.

In both cases, the geographical area of interest is sent to the multimedia content provider that returns to the mobile phone a list of multimedia contents available for such geographical area of interest. A third entry is advantageously provided by the method, corresponding to "bookmark." If the user selects the "bookmark" entry, a list of geographical location comprising multimedia contents already stored inside the IC Card are provided and the step of downloading such multimedia content from the provider is substantially skipped. A further mode for selecting a geographical area may be implemented according to the method, for example entering an identification name of a geographical area of interest through a Get-input command of the IC Card, and waiting for a result from the multimedia content provider if multimedia contents for the geographical area of interest indicated are available.

Figure 4:
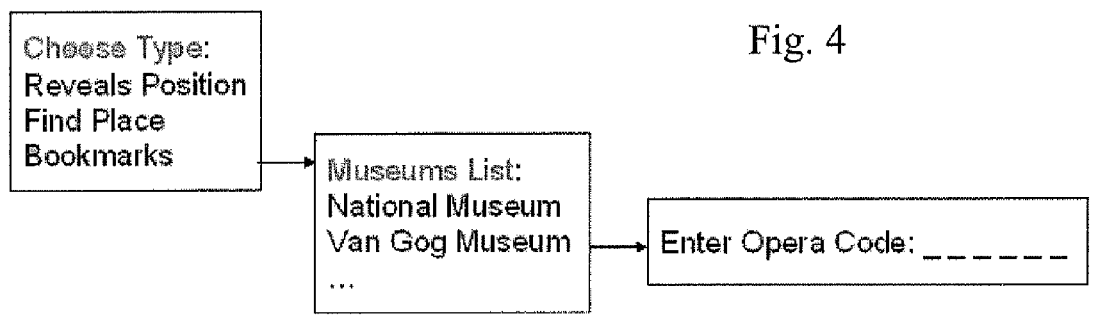
FIG. 4 schematically represents a list of bookmarks according to the method of the present invention.

For example, in FIG. 4 a couple of geographical locations, the "National Museum" and the "Van Gogh Museum" are already stored as bookmarks.

When the list of multimedia content is available for the user, as represented in block d) of the diagram of FIG. 2, he may choose a specific multimedia content, as indicated in block diagram e). The specific multimedia content is reproduced or played by the mobile phone as described above, accessing specific portions corresponding to specific items located in the geographical area of interest.

An aspect is directed to an IC Card for implementing the method described above and more particularly to an IC Card for reading multimedia contents MMC1, MMC2 associated to a geographical area including a plurality of items I1, I2, I3.

The multimedia contents MMC1, MMC2 are of the type stored in a multimedia content provider and including information of one or more items I1, I2, I3.

More particularly, the IC Card comprises a processor and a memory. Stored in the memory are computer executable modules to detect a geographical area of interest AI, connect to the multimedia content provider and select at least one multimedia content MMC1 of the detected geographical area of interest AI, and download the selected multimedia content MMC1 into a memory of the IC Card. The IC Card may include circuitry to provide an identification code idI1 of an item I1 located in the detected geographical area of interest AI and to access a portion P of the multimedia content MMC1 which stores information of the identified item I1. Alternatively or additionally, this function may be performed by a computer executable module stored in the memory of the IC Card.

The circuitry for providing an identification code may comprise a ZigBee device for receiving a wireless message from the items. In this way the mobile phone may reproduce or play a specific portion of the multimedia content, more particularly a portion associated to an item positioned where the mobile phone and the user are located.

Advantageously, according to the method and to the corresponding IC Card, a mobile phone that is a light weight, small sized, and easy to use, is provided to access multimedia information.

Advantageously, the method provides that the mobile phone downloads the multimedia content from a multimedia content provider, when a network coverage of a telecom operator is available, and stores the downloaded multimedia content so that it may be reproduced or played one or more times, stopped and re-executed, or restarted from a predetermined portion associated to a specific item when the network coverage is absent.

Advantageously, the method and the IC Card provides the addition of security to the step of downloading and/or playing the multimedia contents, for example avoiding the reproduction or playing of such contents through an IC Card not enable or authorized to view the content. In fact, the IC Card may support a plurality of security functions for protecting data. More particularly, an IC Card including a MegaSIM Chipset provides USIM security functions together with flash memory with high storage capability.

Advantageously, the method provides that the mobile phone may detect the geographical area of interest or provide to the user a list of predetermined geographical area for which downloading a corresponding multimedia content. Advantageously, the method provides that the mobile phone may access a specific portion of the multimedia content, associated to a specific item, by detecting the specific item. Advantageously, such detection may be executed automatically, since the method provides the IC Card with detection means or circuitry to identify codes associated to the items, or manually, since the method sends the identification code of an item via an input interface of the mobile phone.

That which is claimed:

1. A method of accessing a plurality of multimedia contents associated with a geographical area including a plurality of items, each multimedia content being stored in a multimedia content provider and including information of at least one of the items, the method comprising:
   providing an IC card application for a mobile device to execute the following
      detect the geographical area and send the detected geographical area to a memory of an IC card, with the geographical area being detected by identifying the geographical area from among a list of geographical areas stored in the memory of the IC card,
      connect to the multimedia content provider and select content from the plurality of multimedia content associated with the detected geographical area,
      download and send the selected multimedia content to the memory of the IC Card, and
      receive an identification code associated with an item of the plurality thereof located in the detected geographical area and access information about the item in the selected multimedia content.

2. A method according to claim 1 wherein the IC card application for the mobile device causes the mobile device to cooperate with a cellular network to detect the geographical area.

3. A method according to claim 1 wherein the list of geographical areas is divided into a plurality of subsets of geographical areas.

4. A method according to claim 3 wherein the selected multimedia content is selected from multimedia content associated with a subset of the geographical area.

5. A method according to claim 1 wherein the identification code is received wirelessly from a device associated with the item and stored in the memory of the IC card.

6. A method according to claim 5 wherein the wireless identification code is received by a wireless device included in the IC Card.

7. A method according to claim 1 wherein the identification code is received from user input of the identification code into an input device of the mobile device.

8. A method of interfacing an IC card with a mobile device comprising:
   using an IC card to cause the mobile device to
      detect a geographical area and send the detected geographical area to a memory of the IC card, with the geographical area being detected by identifying the geographical area from among a list of geographical areas stored in the memory of the IC card,
      connect to a multimedia content provider and select content from a plurality of multimedia content associated with the detected geographical area,
      download and send the selected multimedia content to the memory of the IC Card, and receive an identification code associated with an item located in the detected geographical area and access information about the item in the selected multimedia content.

9. A method according to claim 8 wherein the IC card application for the mobile device causes the mobile device to cooperate with a cellular network to detect the geographical area.

10. A method according to claim 8 wherein the identification code is received wirelessly from a device associated with the item and stored in the memory of the IC card.

11. A method according to claim 10 wherein the wireless identification code is received by a wireless device included in the IC Card.

12. An IC card comprising:
   an IC card substrate; and
   a processor and a memory carried by the IC card substrate and cooperating to cause a mobile device to
      detect a geographical area and send the detected geographical area to the memory of the IC card, with the geographical area being detected by identifying the geographical area from among a list of geographical areas stored in the memory of the IC card,
      connect to a multimedia content provider and select content from a plurality of multimedia content associated with the detected geographical area,
      download and send the selected multimedia content to the memory of the IC Card, and
      receive an identification code associated with an item located in the detected geographical area and access information about the item in the selected multimedia content.

13. An IC card according to claim 12 wherein the processor and the memory cause the mobile device to cooperate with a cellular network to detect the geographical area.

14. An IC card according to claim 12 wherein the list of geographical areas is divided into a plurality of subsets of geographical areas.

15. An IC card according to claim 14 wherein the selected multimedia content is selected from multimedia content associated with a subset of the geographical area.

16. An IC card according to claim 12 wherein the identification code is received wirelessly from a device associated with the item and stored in the memory of the IC card.

17. An IC card according to claim 16 wherein the wireless identification code is received by a wireless device included in the IC Card.

18. An IC card according to claim 12 wherein the identification code is received from user input of the identification code into an input device of the mobile device.

19. An integrated circuit for an IC card comprising:
   a processor configured to cause a mobile device to
      detect a geographical area and send the detected geographical area to a memory of the IC card, with the geographical area being detected by identifying the geographical area from among a list of geographical areas stored in the memory of the IC card,
      connect to a multimedia content provider and select content from a plurality of multimedia content associated with the detected geographical area,
      download and send the selected multimedia content to the memory of the IC Card, and
      receive an identification code associated with an item located in the detected geographical area and access information about the item in the selected multimedia content.

20. An integrated circuit according to claim 19 wherein the processor and the memory cause the mobile device to cooperate with a cellular network to detect the geographical area.

21. An integrated circuit according to claim 19 wherein the list of geographical areas is divided into a plurality of subsets of geographical areas.

\* \* \* \* \*